Patented Aug. 10, 1948

2,446,595

UNITED STATES PATENT OFFICE 2,446,595

METHOD OF DECOMPOSING ALKALI METAL SALTS

Felix Jourdan and Jorge Beéche, Vina Del Mar, Chile

No Drawing. Application June 18, 1945, Serial No. 600,238

1 Claim. (Cl. 23—184)

Our invention consists of a general method of decomposition of salts by means of heat in order to separate and extract its constituent elements.

The basis of our process consists of making spheres or granules, ovoids or briquettes of a stable nature that may be employed in the process repeatedly, starting with a mixture of the salt or salts that are to be treated and decomposed and a support reactive or non reactive with the salt or salts.

For preparing these spheres or granules a rotating granulator may be employed. For making the ovoids or briquettes a mechanical press may be used.

The spherical or rounded form is preferable because on account of this shape the handling is easier and also because the points of contact with the walls of the furnaces where they are decomposed are reduced to a minimum.

The spheres, ovoids or briquettes which herein we will call granules, permit to make use of physico-chemical phenomena of the highest interest such as actions of capillarity and osmosis, catalytical action, concentration of heats of reactions within the granules, in a medium where these various phenomena may be controlled.

Moreover, and of the highest technical and economical significance, supports may be employed of such a nature that for each treatment operation it is not necessary to prepare new granules, making them at the start of such a consistency and hardness that they may be used over and over again in repeated operations and cycles of decomposition.

With such an end in view, the initial granules that may be composed of a salt or salts that react or do not with the support, are heated; for example, carbonate or bicarbonate of sodium and oxide of iron, or alkaline nitrates or carbonates and oxide of iron, or pure nitrate, or sodium sulfate, or sodium chloride and oxide of iron and even oxide of iron with calcium hydroxide, or lime and silica. These granules after they are made are heated until calcination then they are leached and well washed of all their soluble salts and they remain with great hardness and porosity due to the soluble salts having been extracted from them.

These granules can also be hardened more by the addition of cement, regulating its quantity so as not to impair their porosity.

These granules when made with the salt or salts desired to decompose are then heated at the desired and adequate temperature at normal pressure, under vacuum or under pressure in order to decompose the salt. Once the decomposition is complete, we obtain hard granules that are easily handled, that can be easily leached and washed in order to extract the soluble salts without losing their shape.

Once the soluble products in the granules have been leached by means of hot or cold water or by means of any other solvent of the salts, the granules are dried. They have then remained with the porosity left by the salt or salts that have been leached out.

These same granules can then be charged again with the salt or salts desired to decompose by immersing them in a concentrated or saturated hot solution of the salt that is desired to decompose regulating the temperature or concentration as desired. They may also be immersed in a salt or salts in a molten state. Its capillary force due to its porosity will then provoke the absorption of the concentrated hot solution or of the molten salt. The excess liquid may be disposed of by allowing the granules to drain, for a short while, the salt solution or the molten salt. After this treatment the granules will then be ready for the decomposition treatment, directly or after drying.

Practical examples will help to explain this method of treatment. Supposing that it is desired to treat sodium sulfate in order to convert it into sulfuric acid and caustic soda. First the granulator is charged with oxide of iron and anhydrous sodium sulfate. The granulator is put in motion, moisture added and once the granules are formed the speed of the granulator is increased in order to obtain granules of maximum density. On starting granulation the density may be 0.9 and at the end may reach 1.2 to 1.3.

These granules are placed in a basket or in a perforated receptacle made of iron. These containers with their charge are then placed inside a decomposing furnace which is heated under vacuum in order to reduce the temperature of decomposition of the salt and so produce the sulfurous gases that are drawn off and treated separately. The granules that remain with the caustic soda in the form of sodium ferrite, are taken out of the furnace and submerged in hot water taking care not to reach boiling temperature. The granules are so leached and washed by countercurrent method in order to extract from them the caustic soda in the form of a concentrated solution of lye. These granules after leaching and washing are again immersed in a hot concentrated solution of sodium sulfate which is again absorbed by capillarity. The granules are then dried and are ready for another decomposing treatment in the furnace. The same procedure is repeated an indefinite number of times and the granules suffer no deformation or alteration.

The furnace may be heated internally at its axis, by induction or by high frequency induction current. This will diminish corrosion of the furnace walls.

With this process or method it is possible to treat sodium chloride mixing it with iron oxide and granulating it or adding besides a little lime and silica. These are heated in the presence of water vapor under vacuum in the decomposing furnace, hydrochloric acid is given off and sodium ferrite remains in the granules. These granules are leached, washed and dried and are then ready to be immersed in a hot solution of sodium chloride and treated in a similar manner as narrated in the foregoing paragraphs.

For over fifty years it has been known that sodium nitrate in the presence of oxide of iron heated at an adequate temperature decomposes in nitrogen gases and sodium oxide. Up to the present all the processes applying this principle that have been patented have not been successful due to the low recoveries of the decomposed nitrate and also due to the poor recovery of the caustic soda. In fact if the mixture of nitrate and oxide of iron is heated, the mass melts and sticks to the walls of the furnace being very difficult to discharge it. It has also been proposed to treat the mixture in a pulverized form but it is difficult to heat it since conduction of heat is low. Besides on leaching and washing colloidal iron oxide is formed as well as very fine oxide when boiling is attempted. Iron oxide in these states makes any filtration very difficult and costly. Moreover the higher the concentration of the solution the more difficult it is to filter.

As we have mentioned before since the use of iron oxide for decomposing nitrates has been known many years it is then of public use and may then be mixed with sodium and/or potassium nitrate in adequate proportion of two parts of nitrate and one of oxide. Moreover calcium hydroxide, sodium carbonate and a small quantity of sodium silicate may be added as an agglomerant and hardener. These substances are only introduced in small quantities in the mixture. The granules are hardened during their treatment or during a separate treatment submitting them to the action of steam at a few kilos of pressure in an autoclave.

The potassium and/or sodium nitrate is then decompossed in furnaces of any kind or shape under normal pressure, or under vacuum in order to lower the decomposition temperature and so obtain concentrated nitrogen oxides. After the decomposition of the nitrate is completed into nitrogen oxides and sodium and/or potassium ferrite, the granules are leached and washed in hot water at 80° to 90° Cent., taking care not to reach boiling temperatures that produce disgregation of the granules. By means of countercurrent leaching and washing clear and pure concentrated solutions of caustic soda or/and potash are obtained that may reach a concentration of 350 to 400 grams per litre. The granules after leaching and washing are saturated with water. They can be dried or they can be submerged in any state of moisture in a solution of sodium or/and potassium nitrate at such a temperature and concentration that will enable to introduce within the granules the desired quantity of nitrate of sodium or/and potassium for another decomposition.

For making this stable support inert substances such as manganese oxide, calcium carbonate, or substances that react with the nitrate of sodium and/or potassium, such as bauxite rich in iron oxide, or chromite, or wolframite, may be used. In the last three cases, after leaching and washing according to the previously described method, hard granules of iron oxide are obtained that may be used for their content of iron oxide or may be used as a support for absorption of concentrated solutions of alkaline nitrates, sulfates, or chlorides and then decomposed. In other words, the support is stable and may be used for the decomposition of any of these salts and after decomposition extract from them by means of leaching and washing clear, pure and concentrated lyes that need no after filtration and after this treatment the granules remain intact and ready for absorbing new quantities of the salt or other salts that is desired to decompose.

We claim:

The method of decomposing alkali metal salts yielding metal oxides on decomposition together with gaseous decomposition products which comprises preparing a briquette-like mass of the alkali metal salt and a supporting material therefor, heating the mass to decompose the salt, leaching the heated mass to remove alkali metal oxides as hydroxides therefrom while avoiding destruction of the briquette-like supporting mass, impregnating the mass with further quantities of alkali metal salt and heating the mass to decompose the salt.

JORGE BEÉCHE.
FELIX JOURDAN.

REFERENCES CITED

The following references are of record in the file of this patent:

UNITED STATES PATENTS

| Number | Name | Date |
| --- | --- | --- |
| 314,113 | Conley | Mar. 17, 1885 |
| 376,409 | Kayser | Jan. 10, 1888 |
| 514,124 | Lunge | Feb. 6, 1894 |
| 612,364 | Raynaud | Oct. 11, 1898 |
| 1,691,452 | Wolcott | Nov. 13, 1928 |
| 1,922,591 | Krassa | Aug. 15, 1933 |
| 1,956,585 | Oglesby | May 1, 1934 |

FOREIGN PATENTS

| Number | Country | Date |
| --- | --- | --- |
| 7,260 | Great Britain | 1884 |
| 22,018 | Great Britain | 1891 |
| 14,357 | Great Britain | 1914 |
| 127,245 | Switzerland | Aug. 16, 1928 |